United States Patent
Wada et al.

(10) Patent No.: US 12,018,777 B2
(45) Date of Patent: Jun. 25, 2024

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Akira Wada, Tokyo (JP); Yousuke Oku, Tokyo (JP); Yohinori Ando, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 65 days.

(21) Appl. No.: 17/906,692

(22) PCT Filed: Apr. 20, 2021

(86) PCT No.: PCT/JP2021/015974
§ 371 (c)(1),
(2) Date: Sep. 19, 2022

(87) PCT Pub. No.: WO2021/261063
PCT Pub. Date: Dec. 30, 2021

(65) Prior Publication Data
US 2023/0146768 A1    May 11, 2023

(30) Foreign Application Priority Data
Jun. 26, 2020 (JP) ................. 2020-110341

(51) Int. Cl.
*F16L 15/06* (2006.01)
*F16L 15/04* (2006.01)

(52) U.S. Cl.
CPC .............. *F16L 15/06* (2013.01); *F16L 15/04* (2013.01)

(58) Field of Classification Search
CPC .......... F16L 15/06; F16L 15/04; E21B 17/042
See application file for complete search history.

(56) References Cited

U.S. PATENT DOCUMENTS

| 2006/0261595 A1 | 11/2006 | Verger et al. |
| 2007/0176423 A1 | 8/2007 | Reynolds et al. |

(Continued)

FOREIGN PATENT DOCUMENTS

| JP | 1992015385 A | 1/1992 |
| JP | 2007504420 A | 3/2007 |

(Continued)

*Primary Examiner* — David Bochna
(74) *Attorney, Agent, or Firm* — Greer Burns & Crain Ltd.

(57) ABSTRACT

A high-torque threaded connection with male and female threadforms constituted by wedge threads is provided with high shear resistance and high torque resistance. The radius of curvature r1 of the base of the load flank of the first thread 111, located at the end of the male threadform 11 associated with the tip, is not lower than the thread height Th×0.14, and more preferably not lower than Th×0.16, to improve the shear resistance of the first thread 111. Further, the thread pitch may be reduced to increase the number of threads to increase the area of contact for load flanks, or only the radius of curvature of the base of the load flank of the first thread located at the end of the male threadform associated with the tip may be increased and smaller radii of curvature may be provided for the other portions to increase the area of contact for load flanks, thereby maintaining high torque resistance.

8 Claims, 7 Drawing Sheets

(56) References Cited

U.S. PATENT DOCUMENTS

| | | | |
|---|---|---|---|
| 2017/0108151 A1 | 4/2017 | Oku et al. | |
| 2019/0330930 A1 | 10/2019 | Oku et al. | |
| 2020/0325734 A1* | 10/2020 | Langford | E21B 17/042 |
| 2021/0254763 A1 | 8/2021 | Sugino | |
| 2021/0341085 A1 | 11/2021 | Oku et al. | |
| 2022/0252188 A1* | 8/2022 | Oku | F16L 15/06 |

FOREIGN PATENT DOCUMENTS

| | | |
|---|---|---|
| WO | 2015194193 A1 | 12/2015 |
| WO | 2018135267 A1 | 7/2018 |
| WO | 2020039750 A1 | 2/2020 |
| WO | 2020075366 A1 | 4/2020 |

* cited by examiner

THREADED CONNECTION FOR STEEL PIPE

TECHNICAL FIELD

The present disclosure relates to a threaded connection for steel pipe used to connect steel pipes.

BACKGROUND ART

Steel pipes called oil-well pipes are used, for example, for prospecting or production in oil wells, natural-gas wells, etc. (hereinafter collectively referred to as "oil wells" or the like), for developing non-conventional resources such as oil sand or shale gas, for retrieving or storing carbon dioxide (Carbon dioxide Capture and Storage (CCS)), for geothermal power generation, or in hot springs. A threaded connection is used to connect steel pipes. Such threaded connections for steel pipe are generally categorized as coupling type and integral type.

In the case of a coupling-type connection, steel pipes are connected using a tubular coupling. Typically, a female thread is provided on the inner periphery of each of the ends of the coupling, while a male thread is provided on the outer periphery of each of the ends of each steel pipe. Then, an end of one steel pipe is screwed into one end of the coupling and an end of another steel pipe is screwed into the other end of the coupling such that the steel pipes are connected. That is, a coupling-type connection directly connects a pair of pipes, one of which is a steel pipe while the other one is a coupling.

An integral connection directly connects steel pipes, and does not use a separate coupling. Specifically, a female thread is provided on the inner periphery of one end of each steel pipe, while a male thread is provided on the outer periphery of the other end of each steel pipe; into the one end of one steel pipe provided with a female thread is screwed the other end of another steel pipe provided with a male thread, such that the steel pipes are connected.

A pipe end of a steel pipe on which a male thread is provided includes an element to be inserted into a pipe end of a steel pipe or coupling on which a female thread is provided, and thus is usually referred to as "pin". A pipe end of a steel pipe or coupling on which a female thread is provided includes an element for receiving a pipe end of a steel pipe on which a male thread is provided, and thus is referred to as "box". A pin and a box constitute ends of pipes and thus are tubular in shape.

In recent years, well-development techniques such as DwC (Drilling with Casing) and horizontal drilling have become popular, resulting in a rapid increase in demand for high-torque connections. The present applicant has manufactured high-torque connections for relatively small-diameter steel pipes that employ a tapered thread with a dovetailed cross-sectional shape, which may be referred to as wedge thread. Patent Document 1 listed below, for example, discloses such a high-torque connection.

A wedge thread has a thread profile with a stab-flank pitch smaller than its load-flank pitch such that the thread-crest width of the male threadform of the pin gradually decreases as it goes toward the tip along the helix of the thread and, similarly, the thread-groove width of the female threadform of the opposite box gradually decreases as it goes toward the tip. Further, each of the load and stab flanks of each of the male and female threads has a negative flank angle; when the make-up of the pin and box is completed, the load flanks are in contact and the stab flanks are in contact such that the threads of the male threadform and female threadform strongly engage each other. By virtue of such a construction, a threaded connection employing a wedge thread can exhibit high torque resistance.

Patent Document 1, in FIG. 5 and paragraph 0065, discloses a technique whereby each of the thread portion connecting the load flank and crest surface and the thread portion connecting the load flank and groove/root surface includes a curved portion composed of two arcs with different radii of curvature to reduce load concentration at the base of the load flank, thereby improving the fatigue performance of those connecting portions.

PRIOR ART DOCUMENTS

Patent Documents

[Patent Document 1] JP 2007-504420 A

SUMMARY OF THE INVENTION

Problems to be Solved by the Invention

The present applicant has been developing high-torque threaded connections for steel pipes with yet larger diameters. When they designed threaded connections with large diameters of 9⅝" or larger in accordance with the same design standards as are conventional and conducted complex-loading testing on prototypes complying with ISO 13679:2011 Series A, shear fractures occurred in the thread of the male threadform of the pin upon application of the maximum tensile load. According to the conventional design standards adopted by the present applicant, that one of the two arcs forming the above-mentioned curved portion disclosed by Patent Document 1 which is contiguous to the load flank, (23), has a radius of curvature of 0.125 mm, and the arc contiguous to the thread-groove/root surface or thread-crest surface, (24), has a radius of curvature of 0.875 mm.

An object of the present disclosure is to provide a threaded connection for steel pipe with a large diameter which exhibits high torque resistance and also exhibits a shear resistance that addresses the size of steel pipes to be connected.

Means for Solving the Problems

The present inventors conducted extensive research to determine the causes of thread fractures in the male threadform of a high-torque threaded connection for steel pipe with large diameter, and found that, relative to the tensile strength or, in other words, shear resistance required of a steel pipe with large diameter, the shear strength of the thread as measured at the end of the male threadform associated with the pin tip is insufficient such that a shear fracture occurs, the initiation point being the thread base at the end of the male threadform associated with the pin tip. That is, if a shar fracture occurs first in the thread portion for one turn starting at the end of the male threadform associated with the pin tip (hereinafter referred to as "first thread"), the load is concentrated in the second thread, i.e. next thread located inward (i.e. further toward the pipe body of the steel pipe) as seen in a cross section, which causes a shear fracture in the second thread; after the shear fracture in the second thread, the load is concentrated in the third thread, i.e. next thread located inward, which causes a shear fracture here; and shear fractures thus propagate in threads, one thread after another. This is thought to be how shear fractures occur in threads in a wide region of the male threadform.

In a typical male threadform with a trapezoidal cross section, application of an excessive tensile load may cause the pin and box to radially deform and thus cause a jump-out, but rarely causes fractures in threads in a wide region. On the other hand, in a high-torque threaded connection as discussed above, the male and female threadforms do not become disengaged since threads of the male and female threadforms with a dovetailed cross-sectional shape are in strong engagement.

Accordingly, in a high-torque threaded connection with male and female threadforms each constituted by a wedge thread with a dovetailed cross-sectional shape, the stiffness of the first thread, in which a shear fracture occurs first, is crucial to ensure jump-out resistance and shear resistance.

To improve the shear resistance of the end of the male threadform associated with the pin tip, the present inventors focused on the radius of curvature of the border portion between the load flank and thread-groove/root surface in the end portion of the male threadform associated with the pin tip. It is thought that shear fractures in the male threadform as discussed above are caused by stress concentration at the border between the load flank and thread-groove/root surface in the end portion of the male threadform associated with the pin tip; as such, increasing the radius of curvature of this border portion is expected to mitigate stress concentration and improve shear resistance.

Further, it is thought that the larger the thread height, the larger the bending moment acting on the border portion becomes even if the total amount of uniformly distributed loads acting on the load flank is the same, which means larger equivalent plastic strains in the border portion; as such, it is assumed that the border portion needs to be formed by a curved surface with a suitable radius of curvature that depends on the thread height.

Another consideration is that an excessively large thread height means a large cutting depth for the thread groove, which means low workability; as such, it is preferable that, even in a threaded connection for steel pipes with large diameters, the thread height be not larger than 3.0 mm. Further, in order for a connection to exhibit a sufficient torque resistance, sufficient contact areas need to be provided for the load and stab flanks; thus, the thread height is preferably not smaller than 1.8 mm The inventors comprehensively considered these technical findings, and arrived at the threaded connection for steel pipe according to the present disclosure. That is, a threaded connection for steel pipe according to the present disclosure includes: a tubular pin provided at a tip of a steel pipe; and a tubular box adapted to be made up on the pin as the pin is screwed therein. The pin includes a male threadform formed on an outer periphery of the pin. The box includes a female threadform formed on an inner periphery of the box and adapted to engage the male threadform when the connection is made up. Each of the male threadform and the female threadform includes a load flank, a stab flank, a thread-crest surface and a thread-groove/root surface, where a stab-flank pitch of each of the male threadform and the female threadform is smaller than a load-flank pitch of each of the male threadform and the female threadform and, when the connection is made up, the load flank of the male threadform is in contact with the load flank of the female threadform and the stab flank of the male threadform is in contact with the stab flank of the female threadform. It is preferable that each of the load flanks and the stab flanks of the male threadform and the female threadform has a negative flank angle.

The load flank and the thread-groove/root surface of a portion of the male threadform for a predetermined range in a thread-helix direction starting at an end of the male threadform associated with a pin tip may be connected by a first curved surface having a radius of curvature r1 as seen in a longitudinal cross section satisfying the following expression, (1):

$$r1 \geq Th \times 0.14 \quad (1).$$

Here, Th is the thread height, measured at the load flank, in the male threadform as measured in the predetermined range in the thread-helix direction starting at the end of the male threadform associated with the pin tip. Preferably, the thread height Th satisfies 1.8 mm≤Th≤3.0 mm and, more preferably, satisfies $r1 \geq Th \times 0.16$.

Effects of the Invention

According to the present disclosure, the male and female threadforms are each constituted by a wedge thread and thus exhibit high torque resistance, and the end portion of the male threadform associated with the pin tip may be provided with the shear resistance required from a steel pipe with large diameter.

EMBODIMENTS FOR CARRYING OUT THE INVENTION

A threaded connection for steel pipe according to the present embodiment includes: a tubular pin provided at a tip of a steel pipe; and a tubular box adapted to be made up on the pin as the pin is screwed therein. The pin includes a male threadform formed on an outer periphery of the pin. The box includes a female threadform formed on an inner periphery of the box and adapted to engage the male threadform when the connection is made up.

Preferably, the male threadform is constituted by a tapered thread that gradually decreases in diameter toward the tip of the pin. The male threadform may include a perfect-thread portion with a constant thread height and an imperfect-thread portion with a thread height smaller than that of the perfect-thread portion. The male threadform is formed by a cutting process on the outer peripheral surface of the steel pipe, where the cutting depth for the thread groove gradually increases as it goes toward the tip starting at the end of the threadform associated with the pipe body of the steel pipe, ranging from zero up to the thread height of the perfect-thread portion; the imperfect-thread portion of the male threadform is mainly constituted by portions of the threadform where the cutting depth for the thread groove is smaller than the thread height of the perfect-thread portion. In this construction, the diameter of each of the thread-crest surface and thread-groove/root surface of the male threadform as measured in the perfect-thread portion gradually decreases as it goes toward the pin tip in the thread-helix direction, whereas the thread-crest surface in the imperfect-thread portion has a constant diameter while the diameter of the thread-groove/root surface as measured in the imperfect-thread portion gradually decreases as it goes toward the pin tip along the thread-helix direction.

Preferably, the female threadform is constituted by a tapered thread that gradually increases in diameter as it goes toward the tip of the box (i.e., to the pipe body of the steel pipe). The female threadform may include a perfect-thread portion with a constant thread height and an imperfect-thread portion with a thread height smaller than that of the perfect-thread portion. Further, the thread height of the perfect-thread portion of the female threadform may be slightly larger than the thread height of the perfect-thread portion of the male threadform. In such implementations, when the pin and box are made up, the thread-crest surface of the female threadform is in contact with the thread-groove/root surface of the male threadform, while a clearance is formed between the thread-crest surface of the male threadform and the thread-groove/root surface of the female threadform. This clearance prevents seizure or galling during engagement of the male and female threadforms, and may also be advantageously used as a passage for letting out dope.

The female threadform is formed by a cutting process on the inner peripheral surface of a coupling or steel pipe that provides the box. Preferably, the first thread groove of the female threadform, which is engaged, when the pin and box are made up, by the first thread of the male threadform, i.e. male thread in the perfect-thread portion located furthest toward the tip, has such a groove depth that the radial dimension of the contact area for the load flank of the male threadform and the load flank of the female threadform is not smaller than 60%, more preferably not smaller than 70% of the thread height of the first thread of the male threadform.

Each of the male and female threadforms includes a load flank, a stab flank, a thread-crest surface and a thread-groove/root surface, and each of the load and stab flanks of the male and female threadforms has a negative flank angle. That is, each of the male and female threadforms includes a dovetailed thread groove and a dovetailed thread as seen in a longitudinal cross section. In a longitudinal cross section of each of the male and female threadforms, a plurality of thread-crest surfaces and a plurality of thread-groove/rot surfaces appear, where each of the thread-crest surfaces and each of the thread-groove/root surfaces may be shaped, as seen in a longitudinal cross section, so as to be parallel to the pipe axis of the steel pipe or may be inclined relative to the pipe axis of the steel pipe at the taper angle of the tapered thread. The flank angle of the load flank may be, for example, a predetermined value in the range of −10° to −1°, and more preferably a predetermined value in the range of −4° to −6°. The flank angle of the stab flank may be, for example, a predetermined value in the range of −10° to −1°, and more preferably a predetermined value in the range of −4° to −6°. Each of the load and stab flanks of each thread of the male and female threadforms may have a cross-sectional shape that appears as a straight-line in a longitudinal cross section.

In the threaded connection for steel pipe according to the present embodiment, the stab-flank pitch of the male and female threadforms is smaller than the load-flank pitch of the male and female threadforms. Thus, the male threadform is constituted by a wedge thread having a thread width that decreases, and a thread-groove width that increases, as it goes toward the tip of the pin, and the female threadform is constituted by a wedge thread having a thread width that decreases, and a thread-groove width that increases, as it goes toward the tip of the box. The load-flank pitch may be, for example, a predetermined value in the range of 8.0 mm to 11.0 mm, and the stab-flank pitch may be, for example, a predetermined value in the range of 7.5 mm to 10.5 mm. The pitch difference between the load-flank and stab-flank pitches, $\Delta p$, may be 0.3 mm to 0.6 mm, for example.

Figure 4:
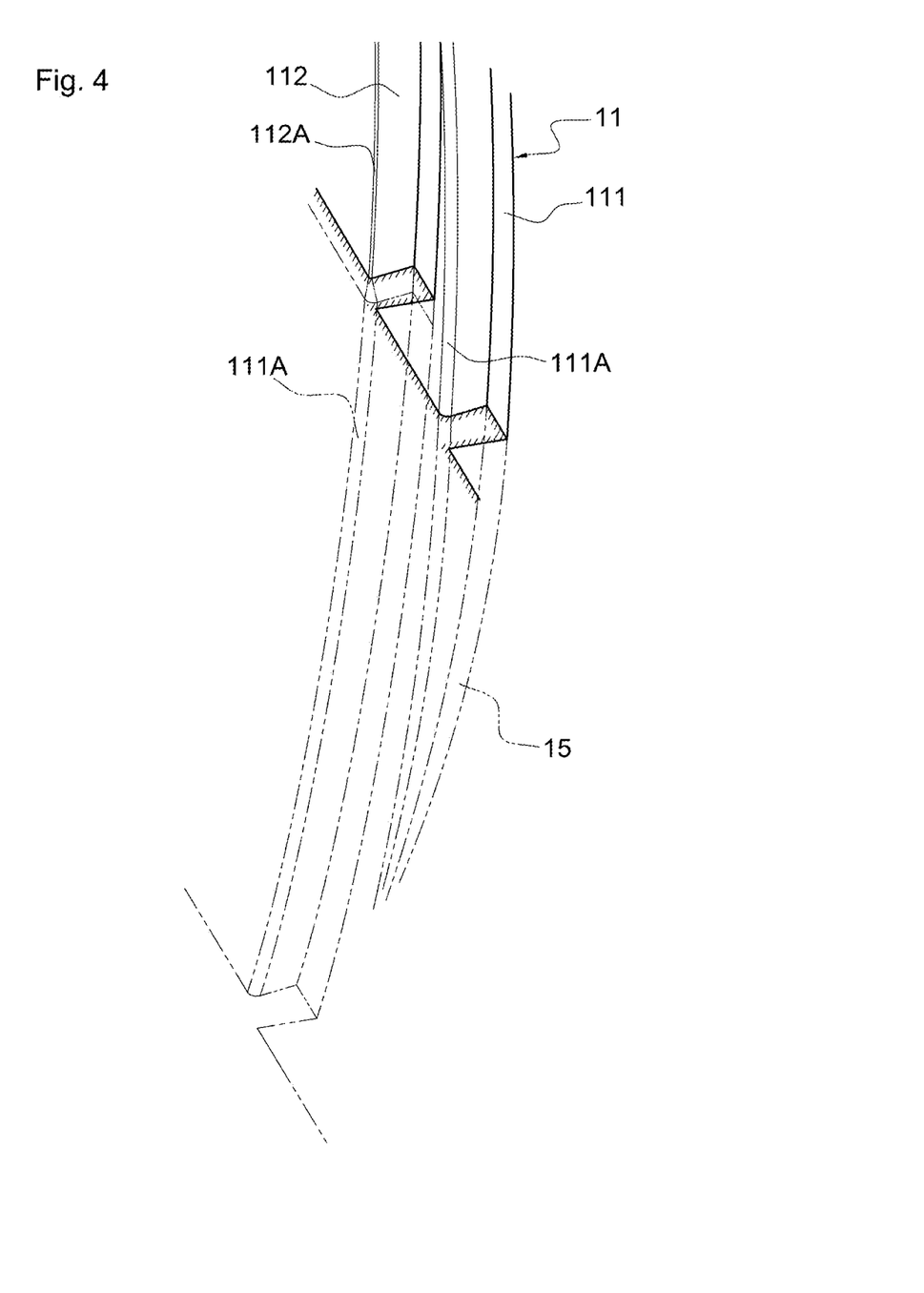
FIG. 4 is an enlarged perspective view of the portions of the male threadform that connect the first and second threads.

In the present disclosure, "male threadform" means a male-thread portion with a load flank in contact with the load flank of a female thread and a stab flank in contact with the stab flank of a female thread when the pin and box are made up, regardless of whether it is part of a perfect-thread portion or an imperfect-thread portion. "Female threadform" means a female-thread portion with a load flank in contact with the load flank of a male thread and a stab flank in contact with the stab flank of a male thread when the pin and box are made up, regardless of whether it is part of a perfect-thread portion or an imperfect-thread portion. It is possible to provide, located further toward the tip of the pin than the perfect-thread portion of the male threadform 11 is, an imperfect-thread portion 15 of which at least one of the stab and load flanks is not in contact with a female thread, as shown in FIG. 4, for example; nevertheless, since such an imperfect-thread portion does not contribute to torque resistance, it does not constitute part of a "male thread" in this disclosure. Further, it is possible to provide, located further toward the tip of the box than the perfect-thread portion of the female threadform is, an imperfect-thread portion of which at least one of the stab and load flanks is not in contact with a male thread; nevertheless, since such an imperfect-thread portion does not contribute to torque resistance, it does not constitute part of a "female thread" in this disclosure.

In the threaded connection for steel pipe according to the present embodiment, the load flank and thread-groove/root surface of a portion of the male threadform for a predetermined range in the thread-helix direction starting at the end of the male threadform associated with the pin tip are connected by a first curved surface having a radius of curvature r1 as seen in a longitudinal cross section satisfying expression (1) below. It is preferable that the radially inner end of the first curved surface be smoothly contiguous to the thread-groove/root surface of the male thread. Further, it is preferable that the radially outer end of the first curved surface be smoothly contiguous to the load flank of the male thread.

$$r1 \geq Th \times 0.14 \qquad (1)$$

Here, Th is the thread height, measured at the load flank, of the male threadform as measured in the predetermined range in the thread-helix direction starting at the end of the male threadform associated with the pin tip, and satisfies 1.8 mm≤Th≤3.0 mm. Preferably, the thread(s) of the male threadform located in the predetermined range in the thread-helix direction starting at the end of the male threadform associated with the tip is/are part of the perfect-thread portion of the male threadform. If the thread height Th is smaller than 1.8 mm, this means a small area of contact between the load flanks of the male and female threadforms, making it impossible to obtain the required torque resistance. On the other hand, if the thread height Th is larger than 3.0 mm, this means a large cutting depth, which in turn means increased cutting time and process costs.

For a thread height Th of 1.8 mm, the radius of curvature r1 is not smaller than 0.252 mm, whereas for a thread height of 3.0 mm, the radius of curvature r1 is not smaller than 0.42 mm; connecting the load flank and thread-groove/root surface in the male threadform with such large radii of curvature was proposed for the first time by the present inventors.

The first curved surface may be provided on the entire length of the male thread.

One method for improving torque resistance is to make the load-flank pitch and stab-flank pitch relatively small to make the number of threads appearing in a longitudinal cross section relatively large. Preferably, the male and female threadforms may have such thread profiles that, when the connection is made up, the load flank and the stab flank of that thread portion of the male threadform which covers at least 8 turns, more preferably 9 turns, in the thread-helix direction starting at the end of the male threadform associated with the pin tip are in contact with the load-flank and the stab flank of the female threadform. More preferably, the load-flank pitch may be not larger than 8.50 mm, the stab-flank pitch may be not larger than 8.10 mm, the associated pitch difference may be not smaller than 0.35 mm and not larger than 0.45 mm, and the minimum thread width as measured at the end of the male threadform associated with the pin tip and measured at a thread base may be not smaller than 2.0 mm. Further, it is preferable that the minimum thread width as measured at the end of the female threadform associated with the box tip and measured at a thread base be also not smaller than 2.1 mm. It is possible to provide, located further toward the tip of the box than the end of the female threadform associated with the box tip is, an imperfect-thread portion of which at least one of the stab and load flanks is not in contact with a male thread; nevertheless, since such an imperfect-thread portion does not contribute to torque resistance, the thread width of the imperfect-thread portion may be smaller than 2.00 mm, depending on the conditions of the cutting process and other factors. The imperfect-thread portion does not constitute part of a "female thread" in this disclosure.

The first curved surface with a large radius of curvature may not be provided across the entire length of the male threadform, but may be provided along at least ½ turn, more preferably at least one turn, in the thread-helix direction starting at the end of the male threadform associated with the pin tip. Thus, the base of the first thread of the male threadform, at which the thread width is at its minimum, can be reinforced by the first curved surface in terms of sheer stiffness, thereby providing a shear fracture occurring in the first thread as its initiation point.

Further, as shown in FIG. 4, for example, the male threadform 11 may include a first thread portion 111 having the first curved surface 111A and a second thread portion 112 contiguous to the first thread portion 111, these portions being arranged in the thread-helix direction. The load flank and the thread-groove/root surface of the second thread portion 112 may be connected by a second curved surface 112A having a smaller radius of curvature r2 than the first curved surface 111A. It is preferable that the first and second curved surfaces 111A and 112A be smoothly contiguous, without a stepped portion at the border therebetween.

The first curved surface may be provided along at least x turns in the thread-helix direction starting at the end of the male threadform associated with the pin tip. Here, x satisfies the following expression, (2):

$$x = (r1 - r2)/\Delta p \quad (2).$$

Here, $\Delta p$ is the pitch difference between the load-flank pitch and stab-flank pitch of the male threadform.

As the male threadform is thus configured, in the second thread portion with a relatively small radius of curvature r2, the radius of curvature of the border portion between the load flank and thread-crest surface of the portions of the female threadform of the box 20 which have the radius of curvature r2 is also relatively small, thereby providing a large area of contact between the load flanks of the male and female threadforms, which is advantageous in terms of torque resistance. Further, the end portion of the second thread portion associated with the pin tip is the portion of the second thread portion which has the smallest thread width; however, as expression (2) is satisfied, the smallest thread width in the second thread portion is about as large as the thread width in the end portion of the first thread portion associated with the pin tip, in which the thread width measured at the thread base is increased by the first curved surface having the large radius of curvature r1, thereby preventing a shear fracture with an initiation point in the end portion of the second thread portion associated with the pin tip.

Figure 3:
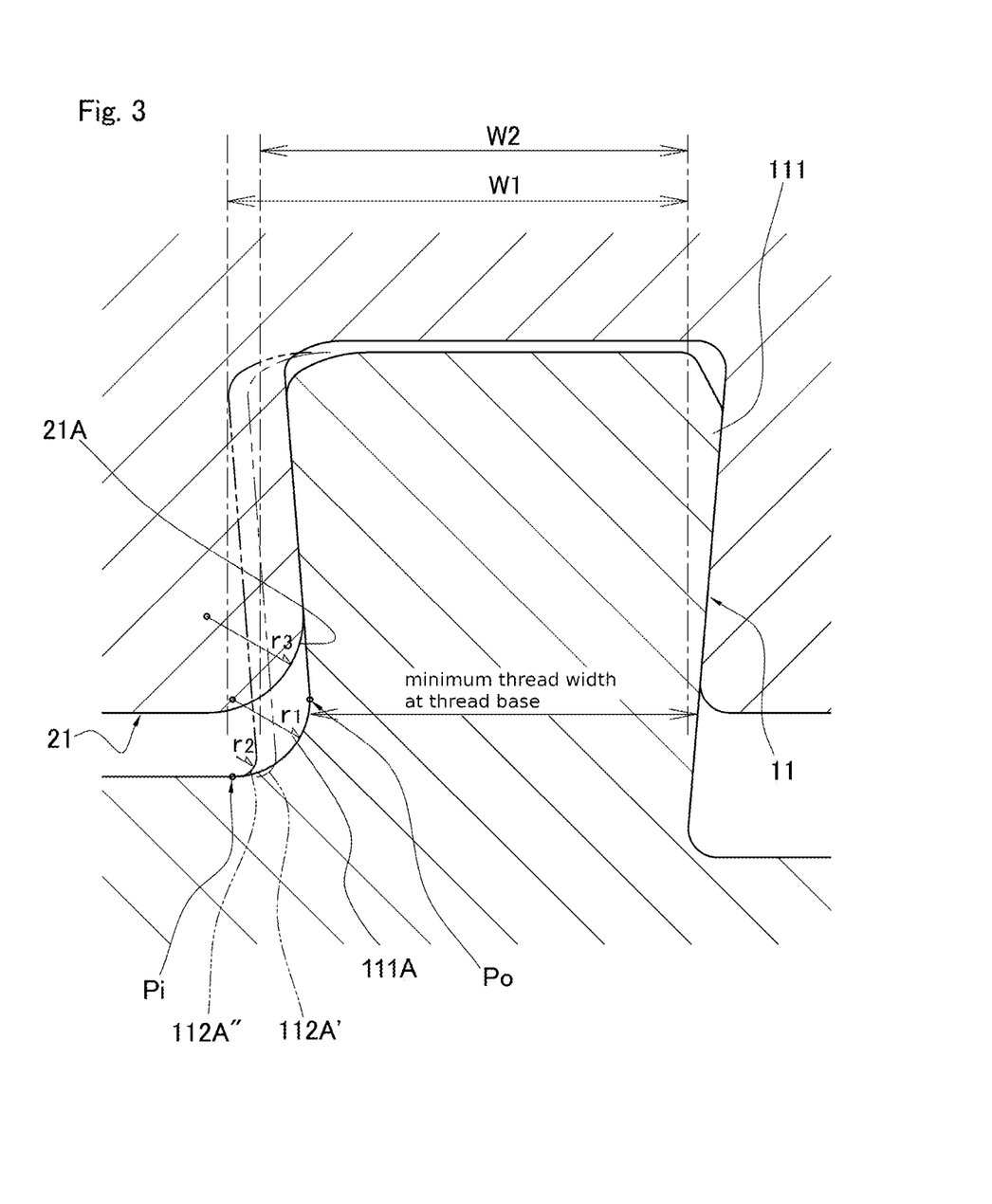
FIG. 3 is an enlarged longitudinal cross-sectional view of a portion of the male threadform including and near the first thread.

That is, if the flank angle of the load flank is about −10° to −1°, for example, as shown in FIG. 3, the first curved surface 111A connecting the load flank to the thread-groove/root surface is generally shaped as a quarter arc as seen in a longitudinal cross section. Thus, the distance in the pipe-axis direction between the radially inner end Pi and radially outer end Po of the first curved surface 111A is substantially equal to the radius of curvature r of the first radius of curvature 111A. FIG. 3 shows phantom lines that represent the second curved surface 112A' found when the end of the second thread portion associated with the pin tip is located at a position about a half turn in the thread-helix direction away from the end of the first thread portion 111 associated with the pin tip and the second curved surface 112A" found when the end of the second thread portion associated with the pin tip is located at a position about ¾ turns away from the end of the first thread portion, superimposed on the end portion of the first thread portion 111 associated with the pin tip to show a comparison between the thread widths. Also, the axial distance between the radially inner end and radially outer end of the second curved surface is substantially equal to the radius of curvature r2 of the second curved surface. The thread width varies by the pitch difference $\Delta p$ between the load-flank and stab-flank pitches for one turn in the thread-helix direction. Thus, for x turns, the thread width increases by $\Delta p \times x$. If the end of the second thread portion associated with the pin tip is located at a position of x turns, the thread width W2 as measured using the radially inner end of the second curved surface (i.e., the thread width measured using the position Pi in FIG. 3) can be represented by the following expression, (3):

$$W2 = W1 - r1 + \Delta p \times x + r2 \quad (3),$$

where W1 is the thread width as measured at the end of the first thread portion associated with the pin tip and measured using the radially inner end of the first curved surface (i.e., the thread width measured using the position Pi in FIG. 3). Here, W1−r1 indicates an approximate position of Po. W1−r1+Δp×x indicates an appropriate position of the outer end of the second curved surface 112A', 112A" denoted as Po. Expression (3) indicates an appropriate position of the inner end of the second curved surface 112', 112A" denoted by Pi. The larger the helical length of the first thread portion 111, the larger W2 becomes. As such, depending on the length of the first thread portion 111, W2 may be smaller than W1 or W2 may be larger than W1.

If W2 is smaller than W1, the second curved surface 112A' rises with the radius of curvature r2, which is small; as such, the thread width of those portions of the second thread which are associated with the second curved surface 112A' may be smaller than the width of the base of the first thread portion 111 (that is, as shown in FIG. 3, the curved surface 112A' may cut into the thread as compared with the surface of the curved surface 111A) and portions of the second thread portion with smaller thread widths may present week points in terms of strength. In view of this, it is preferable that W2 be substantially equal to W1 or larger than W1. Thus, from expression (3) and the condition W2≥W1, x≥(r1−r2)/Δp can be derived. That is, if x is defined as x=(r1−r2)/Δp, it is preferable that the first curved surface be provided along at least x turns in the thread-helix direction starting at the end of the male threadform associated with the pin tip.

For example, if the load-flank pitch is 9.845 mm, the stab-flank pitch is 9.400 mm, the radius of curvature of the first curved surface r1 is 0.4 mm, and the radius of curvature of the second curved surface r2 is 0.1 mm, then, it is preferable that the first curved surface be provided along (0.4−0.1)/(9.845−9.400)≈⅔ turns or longer. If the radius of curvature of the second curved surface r2 is 0.2 mm and the other conditions are the same as above, it is preferable that the first curved surface be provided along about a half turn or longer.

In addition, as the male threadform includes a second thread portion having a second curved surface with a small radius of curvature and the radius of curvature between the load flank and thread-crest surface in those thread portions of the female threadform which are to engage the second thread portion is smaller than that of the below-discussed third curved surface, a large area of contact between the load flanks as a whole can be provided such that the connection can exhibit large torque resistance.

Preferably, in the threaded connection for steel pipe according to the present embodiment, the load flank and the thread-crest surface of the female threadform may be connected by a third curved surface that faces the first curved surface of the male threadform when the connection is made up and has a larger radius of curvature than the first curved surface. This will prevent the border/corner between the load flank and thread-crest surface of the female threadform from interfering with the first curved surface.

Furthermore, a radial clearance may be provided between the thread-crest surface in a portion of the female threadform which is in contact with the load flank in an end portion of the male threadform associated with the pin tip when the connection is made up, on one hand, and the thread-groove/root surface in a portion of the male threadform which faces that thread-crest surface. More preferably, the thread-crest surface in the above-mentioned portion of the female threadform may be the thread-crest surface in the end portion of the female threadform located at the innermost position, with respect to the box, on the female threadform. Further, the thread-crest surface in the above-mentioned portion of the female threadform may have the same diameter as the inner peripheral surface of a tubular threadless extension located inward of the female threadform with respect to the box. Further, the pin may include a tubular threadless extension corresponding to the threadless extension of the box, where it is preferable that the outer peripheral surface of the threadless extension of the pin be not in contact with the inner peripheral surface of the threadless extension of the box when the connection is made up. Furthermore, the pin preferably includes a pin sealing surface located further toward the pin tip than the threadless extension of the pin is, and the box preferably includes a box sealing surface located further toward the box interior than the threadless extension of the box is. When the pin and box are made up, these pin and box sealing surfaces are in contact with each other to form a metal-to-metal seal that can exhibit sealability against external and internal pressures. The threadless extensions are useful to prevent strains caused by compressive-tensile loads acting on the male and female threadforms from affecting the pin and box sealing surfaces. Further, as the above-discussed clearance is created by making the thread height of a portion of the female threadform smaller than the thread height of the perfect-thread portion of the female threadform, it is possible to ensure that the pin wall thickness of the pin portions including and near the pin tip is larger than in implementations where the clearance is created by increasing the thread-groove depth at and near the pin tip. Further, the presence of the clearance prevents the thread crest of the female threadform from directly contacting the thread-base portion of the load flank of the male threadform at the threadform's end associated with the pin tip, at which the thread width is at its smallest, thereby reducing direct damage to the weakest portion of the male threadform.

In some implementations, separate external-pressure and internal-pressure seals may be provided, where the internal-pressure seal may be located further toward the pin tip than the male and female threadforms are and the external-pressure seal may be provided further toward the pipe body than the male and female threadforms are.

Preferably, the radially outer end of the first curved surface is located radially outward of the radially inner end of a portion of the third curved surface which faces the first curved surface and may be located radially inward of the radially outer end of a portion of the third curved surface which faces the first curved surface. This will minimize the distance between the radially inner end of the area of contact between the load flanks of the male and female threads and the radially outer end of the first curved surface, thereby further improving torque resistance.

The threaded connection for steel pipe according to the present embodiment will now be described with reference to the drawings. The same and corresponding components in various drawings are labeled with the same characters, and the same description will not be repeated.

Figure 1:
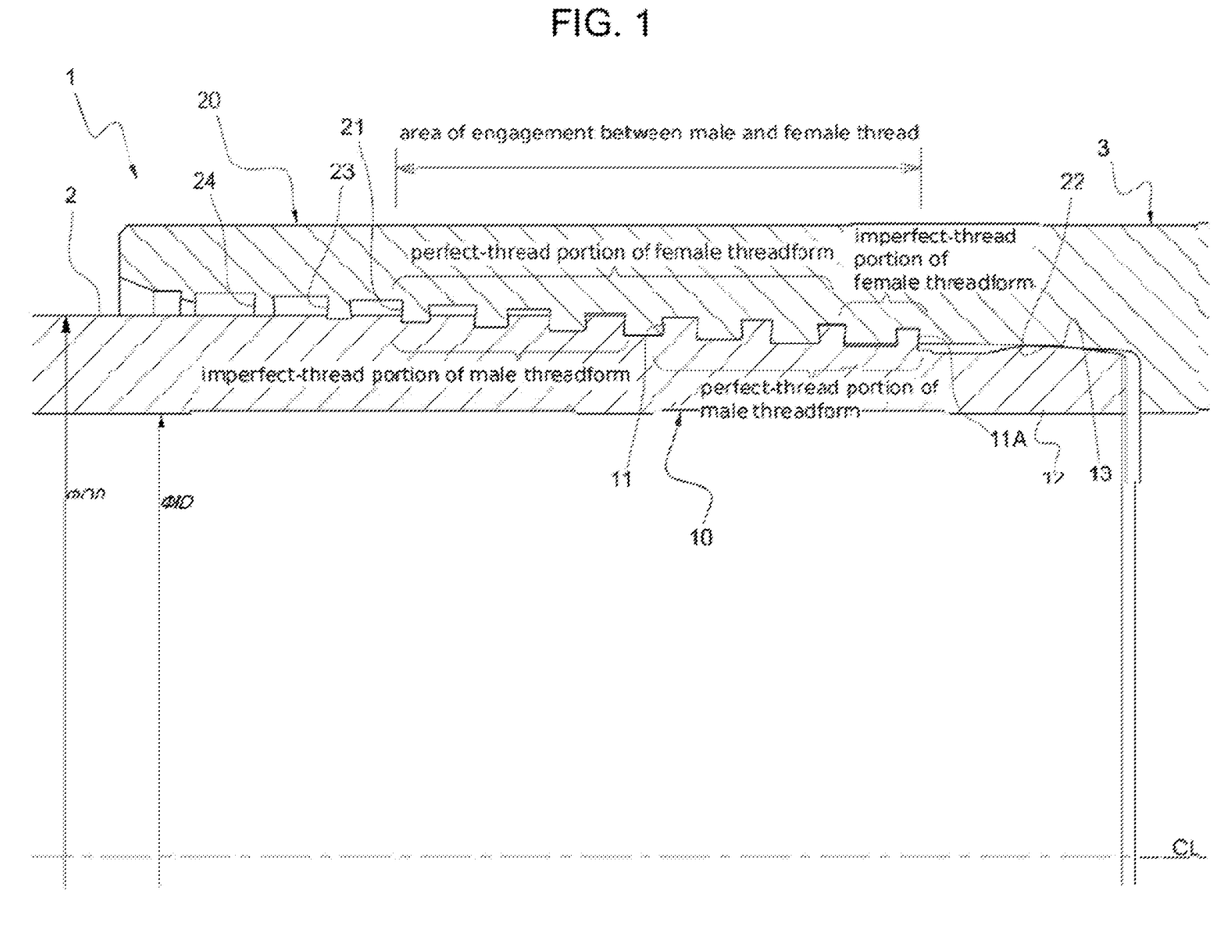
FIG. 1 is a longitudinal cross-sectional view of a threaded connection for steel pipe according to a first embodiment along its pipe axis.

Referring to FIG. 1, a threaded connection for steel pipe according to the present embodiment, denoted by 1, includes a tubular pin 10 and a tubular box 20. The pin 10 is formed at an end of a steel pipe 2. The box 20 is formed at an end of a coupling 3, into which the pin 10 is inserted such that the box is made up on the pin 10. The portions of the steel pipe 2 other than the end portion of the pipe may be herein referred to as "pipe body".

The threaded connection for steel pipe according to the present embodiment may be suitably used in implementations where the outer diameter OD of the pipe body of the steel pipe 2 is not smaller than 240 mm, and more preferably not smaller than 245 mm and still more preferably not smaller than 270 mm. The connection may be suitably used in implementations where the outer diameter OD of the pipe body of the steel pipe 2 is not larger than 400 mm, and more preferably not larger than 350 mm and still more preferably not larger than 310 mm. It is preferable that the pipe body of the steel pipe 2 have a wall thickness that is substantially constant along the entire axial length. Further, it is preferable that the pipe body of the steel pipe 2 have an outer diameter OD and an inner diameter ID that each are substantially constant along the entire axial length. The pin is located at an end of the pipe body of the steel pipe 2. FIG. 1 also shows the pipe axis, CL, of the steel pipe 2.

The pin 10 includes a male threadform 11 constituted by a tapered thread with a diameter that gradually decreases as it goes toward the pin tip, and a lip 12. The male threadform 11 is constituted by a thread formed as a helix on the outer periphery of the pin 10. The male threadform 11 is constituted by a wedge thread with a thread width that gradually decreases as it goes toward the tip of the pin 10. The male threadform 11 has a dovetailed cross-sectional shape defined by its thread crest and thread groove. The lip 12 is contiguous to the male threadform 11 with a threadless extension located in between, the threadless extension extending, toward the pin tip, from the end of the male threadform 11 associated with the pin tip. A pin sealing surface 13 is provided on the outer periphery of the lip 12. In the implementation shown, the pin sealing surface 13 is constituted by a cylindrical sealing surface that has an arc-shaped cross section; alternatively, the pin sealing surface 13 may have a cross section that appears as a straight line or may be shaped as a combination of a straight line and an arc.

The box 20 includes an opening end for receiving the pin 10. The box 20 includes a female threadform 21 formed on its inner periphery and constituted by a tapered thread with a diameter that gradually decreases as it goes toward the box tip, and a box sealing surface 22. The female threadform 21 is constituted by a thread formed as a helix on the inner periphery of the box 20 to be complementary to the male threadform 11. The female threadform 21 is constituted by a wedge thread with a thread width that gradually increases as it goes from the opening end of the box 20 toward its interior. The female threadform 21 has a dovetailed cross-sectional shape defined by its thread crest and thread groove. The box sealing surface 22 is constituted by a taper surface located inward of the female threadform 21 with respect to the box 20. The box sealing surface 22 may be constituted by a cylindrical sealing surface that has an arc-shaped cross section, or may be shaped as a combination of a straight line and an arc as seen in a cross section. A predetermined amount of interference is set between the box and pin sealing surfaces 22 and 13 and, when the connection is made up, the sealing surfaces 13 and 22 are in contact with each other along the entire circumference without a gap to form a metal seal.

Figure 2:
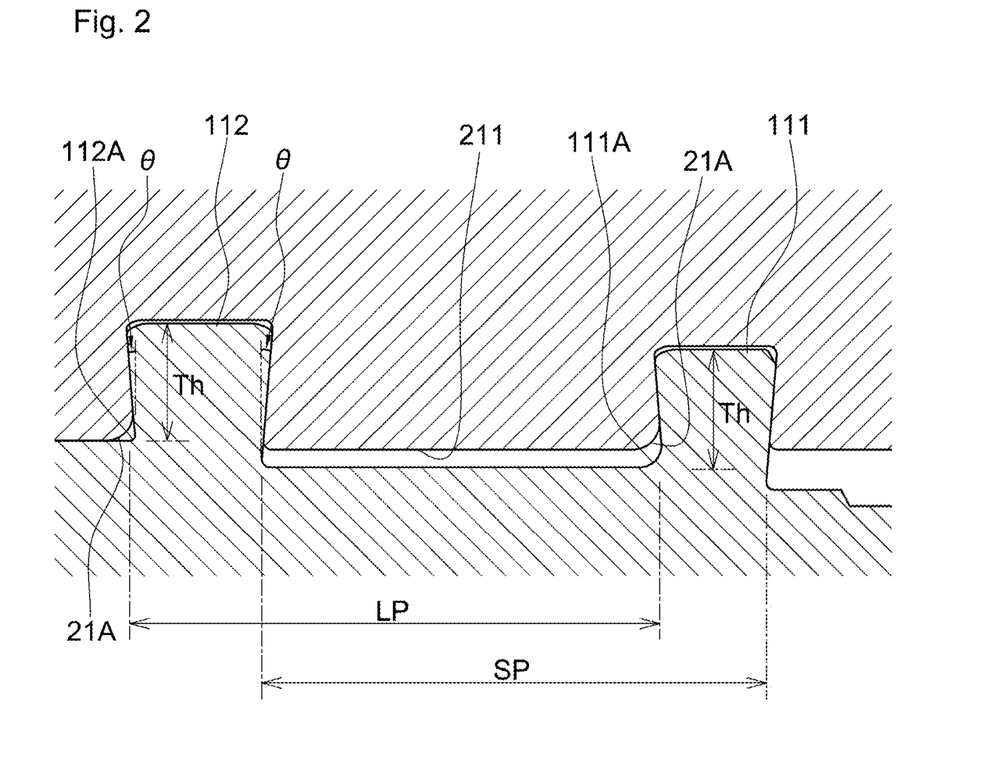
FIG. 2 is an enlarged longitudinal cross-sectional view of a region of the male threadform including the first and second threads.

As shown in FIGS. 1 and 2, the male threadform 11 of the present embodiment includes a perfect-thread portion and an imperfect-thread portion. The perfect-thread portion of the male threadform 11 is a portion with a predetermined thread height Th and in which a thread is formed with a predetermined load-flank pitch LP and a predetermined stab-flank pitch SP. The thread height Th of the male threadform 11 of the implementation shown is 2.2 mm.

The imperfect-thread portion of the male threadform 11 is a portion where the predetermined thread height Th is not provided due to the fact that the imaginary taper surface defining the taper shape of the tapered thread crosses the outer surface of the steel pipe 2 such that the cutting depths on the outer surface of the steel pipe 2 is insufficient. According to the present embodiment, both the pin perfect-thread portion and the pin imperfect-thread portion of the male threadform 11 contact the female threadform 21 at both their load and stab flanks. In the threaded connection 1 shown in FIG. 1, the load-flank pitch LP is 9.845 mm, the stab-flank pitch SP is 9.400 mm, and the minimum thread width in the end portion of the male threadform 11 associated with the pin tip, measured at the base as determined along the thread-height direction, is about 2.8 mm.

Similarly, the female threadform 21 includes a perfect-thread portion and an imperfect-thread portion. The perfect-thread portion of the female threadform 21 begins near the opening end of the box 20 and ends near the second thread of the male threadform 11 of the pin 10. When the pin 10 and box 20 are made up, the threads of the imperfect-thread portion of the female threadform 21 are in engagement with the first thread 11A of the male threadform 11 of the pin 10. According to the present embodiment, both the box perfect-thread portion and the box imperfect-thread portion of the female threadform 21 contact the male threadform 11 at both their load and stab flanks. In the embodiment shown, located further toward the opening end of the box 20 than the perfect-thread portion of the female threadform 21 is, threads 23 and 24 are provided to be contiguous to the female threadform 21 and to be in non-contact with the male threadform 11 at at least their load flanks or stab flanks; in the present embodiment, the threads 23 and 24 are not included in the female threadform 21.

The thread height in the perfect-thread portion of the male threadform 11 is slightly smaller than the thread height in the perfect-thread portion of the female threadform 21. Thus, when the connection is made up, as shown in FIG. 2, a small clearance (for example, about 0.1 mm) is formed between the thread-crest surface of the male threadform 11 and the thread-groove/root surface in the female threadform 21, whereas the thread-crest surface of the female threadform 21 and the thread-root surface of the male threadform 11 are in contact with each other. The region in which the male and female threadforms 11 and 21 are in engagement when made up, i.e., the region in which load flanks of the male threadform 11 are in contact with load flanks of the female threadform 21 and stab flanks of the male threadform 11 are in contact with stab flanks of the female threadform 21, preferably has an axial length of 60 to 100 mm.

As shown in FIG. 2, the load and stab flanks of the threads of the male and female threadforms 11 and 21 have a negative flank angle θ. The flank angles θ of the load and stab flanks may be the same, or different flank angles may be set. In the implementation shown, the flank angle θ of the load and stab flanks is −5.0°. Further, in the implementation shown, the thread taper of the male and female threadforms 11 and 21 is 1/16.

When the pin 10 and box 20 are made up, the stab and load flanks of threads of the male threadform 11 are in contact with the stab and load flanks of threads of the female threadform 21 such that the pin 10 locks on the box 20 to exhibit high torque resistance, while the pin seal 13 fits onto the box seal 22 in interference fit to exhibit high sealability.

As shown in FIGS. 2 to 4, the male threadform 11 of the present embodiment includes a first thread portion 111 having a first curved surface 111A with a relatively large radius of curvature r1 and a second thread portion 112 contiguous to the first thread 111, the first and second thread portions being arranged in the thread-helix direction. The second thread portion 112 account for all of those portions of the male threadform 11 other than the first thread portion 111. The load flank and thread-groove/root surface of the second thread portion 112 are connected by a second curved surface 112A having a radius of curvature r2 smaller than the first curved surface 11A. In the implementation shown, the radius of curvature r1 of the first curved surface 111A is 0.4 mm and the radius of curvature r2 of the second curved surface 112A is 0.1 mm.

As shown in FIG. 4, the first thread portion 111 covers about one turn in the thread-helix direction beginning at the end of the male threadform 11 associated with the pin tip. This is not smaller than $(0.4-0.1)/(9.845-9.400)=0.674$ turns, calculated from expression (2) provided above, and the thread width in the end portion of the second thread portion 112 associated with the pin tip, as measured at its base, is clearly larger than the thread width in the end portion of the first thread portion 111 associated with the pin tip, as measured at its base.

Further, in the present embodiment, the load flank and thread-crest surface in the female threadform 21 are connected by a third curved surface 21A having a radius of curvature r3 larger than the radius of curvature r1 of the first curved surface 111 of the male threadform 11. In the implementation shown, the radius of curvature r3 of the third curved surface 21A is 0.5 mm. In the implementation shown, the third curved surface 21A is provided along the entire female threadform 21; alternatively, a third curved surface 21A having a relatively large radius of curvature r3 may be provided only in those portions of the female threadform which face the first curved surface 111A when the pin 10 and box 20 are made up, and a curved surface having a radius of curvature smaller than the radius of curvature r3, e.g. 0.5 to 2.0 mm, may be provided between the load flank and thread-crest surface in the other portions of the female threadform 21.

Further, as shown in FIGS. 2 and 3, a radial clearance is provided between the thread-crest surface of the first thread 211 of the female threadform 21, which is in contact with the load flank of the first thread portion 111 at the end of the male threadform 11 associated with the pin tip, on one hand, and those portions of the thread-groove/root surface in the male threadform 11 which face those portions of the thread-crest surface when the connection is made up. The size of this clearance is smaller than the radius of curvature r1 of the first curved surface 111A, and about 0.3 mm in the implementation shown.

Furthermore, the radially outer end of the first curved surface 111 is located radially outward of the radially inner end of the third curved surface 21A and is located radially inward of the radially outer end of the third curved surface 21A.

Figure 5:
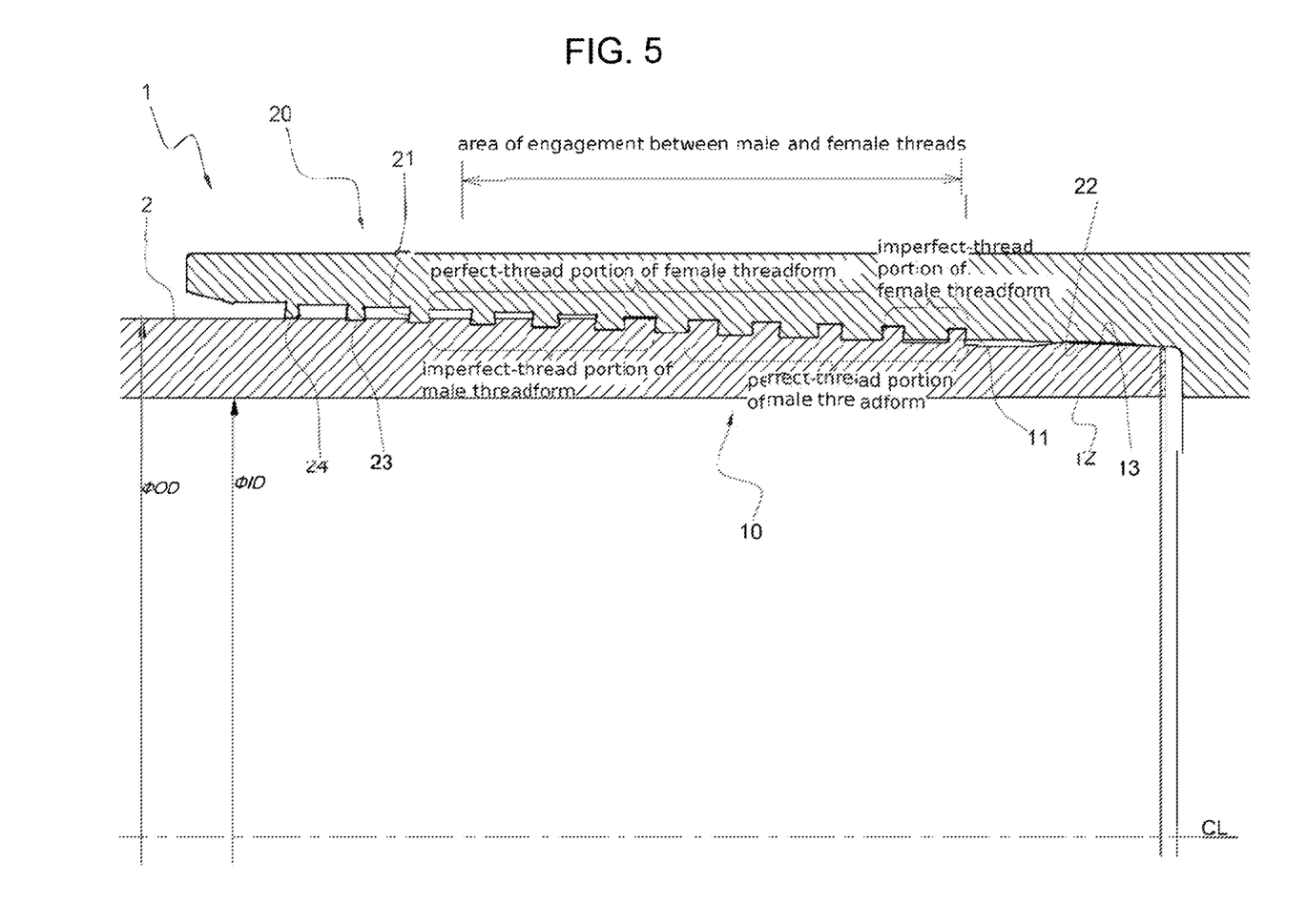
FIG. 5 is a longitudinal cross-sectional view of a threaded connection for steel pipe according to a second embodiment along its pipe axis.

FIG. 5 shows a threaded connection for steel pipe according to a second embodiment, where the load-flank and stab-flank pitches are somewhat smaller than those of the threaded connection of the first embodiment, thereby increasing the number of threads appearing in a longitudinal cross section. Specifically, the load-flank pitch is 8.466 mm and the stab-flank pitch is 8.084 mm. As a result, the minimum thread width in the end portion of the male threadform 11 associated with the pin tip, as measured at the thread base, is about 2.1 mm.

The present disclosure may be employed not only in a coupling-type threaded connection, but also in an integral threaded connection. Otherwise, the present disclosure is not limited to the above-illustrated embodiments, and various modifications are possible without departing from the spirit of the present disclosure.

EXAMPLES

To verify the effects of the threaded connection for steel pipe according to the present embodiment, numerical analysis simulations were performed using the elasto-plastic finite element method to evaluate its shear resistance and torque resistance.

<Test Conditions>

In the finite element analyses (i.e. FEM analyses), a plurality of specimens (i.e. analysis models) with different thread profiles were created, and elasto-plastic finite element analysis was performed on each of the specimens and a comparison was made between the different values of performance.

Each of specimens #1 to #4 had a basic construction consistent with that of the thread connection of the first embodiment, where the first curved surface was provided along the entire male threadform. In specimen #1, the radius of curvature of the first curved surface was 0.1 mm; in specimen #2, 0.2 min; in specimen #3, 0.3 mm; and in specimen #4, 0.4 mm.

Each of specimens #5 to #8 had a basic construction consistent with that of the threaded connection of the second embodiment, where the first curved surface was provided along the entire male threadform. In specimen #5, the radius of curvature of the first curved surface was 0.1 mm; in specimen #6, 0.2 mm; in specimen #7, 0.3 mm; and in specimen #7, 0.4 mm.

The material of each specimen was oil-well pipe material Q125 in accordance with the API standards (nominal yield stress YS=862 MPa (125 ksi)).

To allow for a comparison with conventional products, comparative models were created each having two radii of curvature (i.e. radius of curvature of 0.125 mm and radius of curvature of 0.875 mm) on the border portion between the load flank and thread-root surface in the male threadform and were evaluated in the similar manner.

[Shear Resistance]

Figure 6:
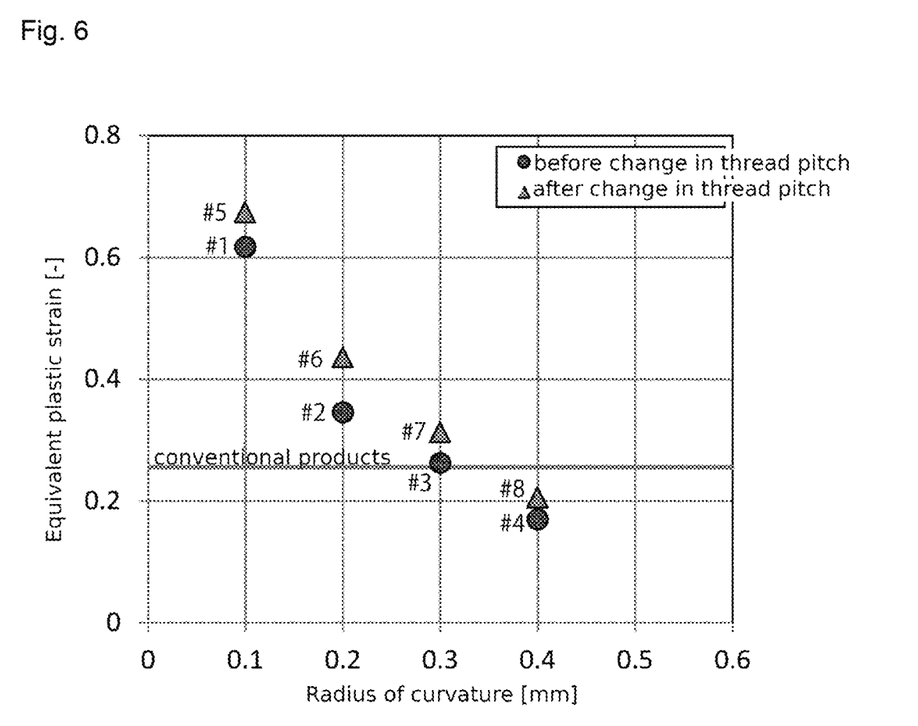
FIG. 6 is a graph showing results of evaluation of equivalent plastic strain by FEM analysis.

To evaluate the shear resistance, a tensile load of 100% of the level at which the pipe body of the steel pipe yields was applied, and the equivalent plastic strain at the initiation point for a shear fracture in the male threadform, i.e. position on the first curved surface at the thread-base portion of the load flank in the end portion of the male threadform associated with the pin tip, was calculated, and it was determined that the smaller this value, the better the shear resistance. The evaluation results are shown in FIG. 6.

[Evaluation of Torque Resistance]

Figure 7:
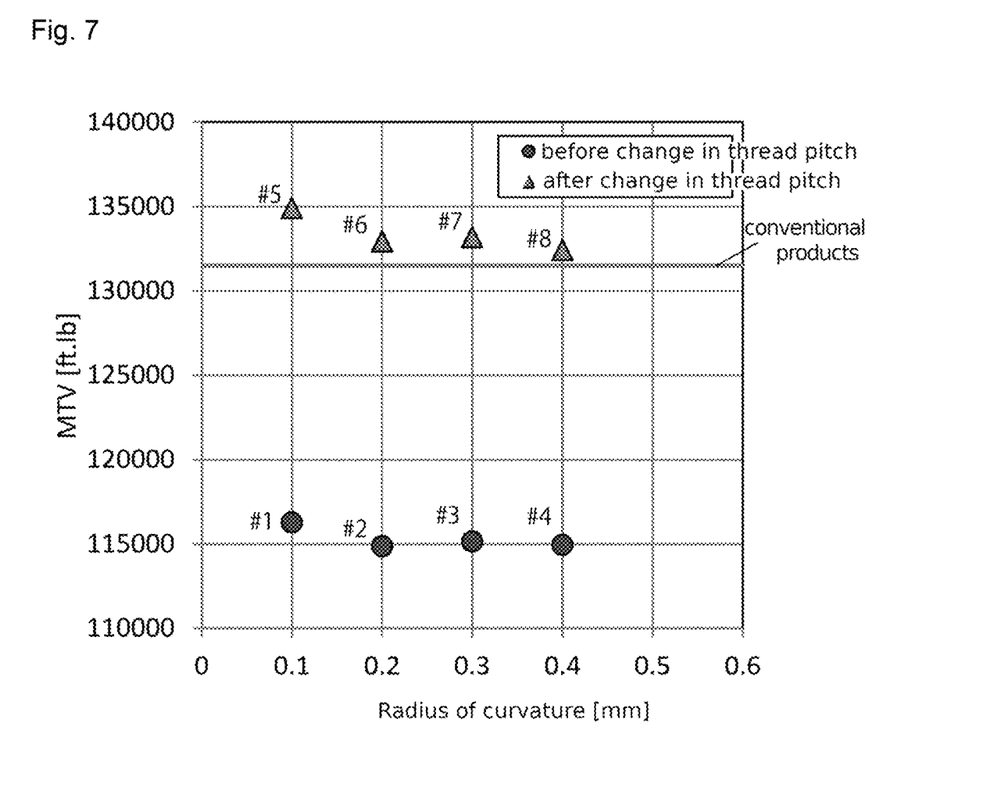
FIG. 7 is a graph showing results of evaluation of torque resistance by FEM analysis.

To evaluate the torque resistance, the value at which yield starts in the make-up torque diagram, i.e. Maximum Torque Value ("MTV"), was taken to define yield torque, and it was determined that the higher this value, the better the torque resistance. The evaluation results are shown in FIG. 7.

[Evaluation Results]

As shown in FIG. 6, the equivalent plastic strains in the conventional products with two radii of curvature, were relatively low, presumably because strains concentrated in the portion with the radius of curvature of 0.125 mm were mitigated in the portion with the radius of curvature of 0.875 mm. The evaluation results for specimens #1 to 4 and #5 to #8 with the first curved surface are as follows: as the radius of curvature increased, the equivalent plastic strain generated in the first curved surface decreased; in specimens #1 to #4, for radii of curvature larger than 0.30 mm, the equivalent plastic strain was lower than in the conventional products; and in specimens #5 to #8, the equivalent plastic strain was lower than in the conventional products for radii of curvature larger than 0.35 mm. Since these specimens had a thread height Th of 2.2 mm, the following evaluation results are available: the equivalent plastic strains in specimens #1 to #4 were lower than in the conventional products if the radius of curvature r1 satisfied r1≥Th×0.14, while the equivalent plastic strains in specimens #5 to #8 were lower than in the conventional products if the radius of curvature r1 satisfied r1≥Th×0.16.

On the other hand, the torque resistance was hardly affected by the changes in the radius of curvature of the first curved surface of the male threadform located at the base of the load flank: specimens #1 to #4 had generally the same value and specimens #5 to #8 had generally the same value. It is assumed that the torque resistances in specimens #1 to #4 were lower than in the conventional products due to the decrease in the area of contact between the load flanks caused by the increased radius of curvature of the top portion of the load flank of the female threadform over the conventional products. In contrast, specimens #5 to #8, which had load-flank pitches and stab-flank pitches reduced to increase the area of contact between the load flanks, exhibited higher torque resistances than the conventional products.

There had been concerns that reducing the load-flank pitch and stab-flank pitch might cause a reduction in the thread width in the end portion of the male threadform associated with the pin tip and thus significantly reduce shear resistance; however, the evaluation results show that, as shown in FIG. 6, due to an increase in the radius of curvature, shear resistance was also higher than in the conventional products, which shows that the present disclosure provides a threaded connection that is better in terms of both shear resistance and torque resistance than conventional products.

Regarding specimens #1 to #4, although the torque resistance was lower than in the conventional products, the shear resistance was better than in the conventional products since the radius of curvature of the first curved surface was larger than 0.3 mm, which suggests that these implementations are useful in applications that do not require high torque resistance, and employing other means for improving torque resistance can make these implementations applicable in products requiring torque resistance.

Similar evaluations were made for specimens with increased radii of curvature of the base portion of the load flank of only the first thread of the male threadform, which is thought to be an initiation point for a shear fracture; it was found that the torque resistance and shear resistance were barely affected by the changes in the radius of curvature only in the first thread.

However, it is assumed that reducing the radius of curvature of the top portion of the load flank in portions of the female threadform that do not engage the first thread of the male threadform and thus increasing the area of contact between load flanks may significantly increase torque resistance.

EXPLANATION OF CHARACTERS

1; threaded connection for steel pipe; 2: steel pipe; 10: pin; 20: box;
11: male threadform; 111: first thread portion; 111A: first curved surface; r1: radius of curvature;
112: second thread portion; 112A: second curved surface; r2: radius of curvature;
21: female threadform; 21A: third curved surface; r3: radius of curvature;
2: steel pipe

The invention claimed is:

1. A threaded connection for steel pipe, comprising: a tubular pin provided at a tip of a steel pipe; and a tubular box adapted to be made up on the pin as the pin is screwed therein, wherein the pin includes a male threadform formed on an outer periphery of the pin, the box includes a female threadform formed on an inner periphery of the box and adapted to engage the male threadform when the connection is made up, each of the male threadform and the female threadform includes a load flank, a stab flank, a thread-crest surface and a thread-groove/root surface, where a stab-flank pitch of each of the male threadform and the female threadform is smaller than a load-flank pitch of each of the male threadform and the female threadform and, when the connection is made up, the load flank of the male threadform is in contact with the load flank of the female threadform and the stab flank of the male threadform is in contact with the stab flank of the female threadform, and where each of the load flanks and the stab flanks of the male threadform and the female threadform has a negative flank angle, wherein the load flank and the thread-groove/root surface in a portion of the male threadform for a predetermined range in a thread-helix direction starting at an end of the male threadform associated with a pin tip are connected by a first curved surface having a radius of curvature r1 as seen in a longitudinal cross section satisfying the following expression, (1):

$$r1 \geq Th \times 0.14 \quad (1),$$

where Th is the thread height, measured at the load flank, in the male threadform as measured in the predetermined range in the thread-helix direction starting at the end of the male threadform associated with the pin tip, and satisfies 1.8 mm≤Th≤3.0 mm.

2. The threaded connection for steel pipe according to claim 1, wherein the male threadform includes a first thread portion having the first curved surface and a second thread portion contiguous to the first thread portion, these portions being arranged in the thread-helix direction, and the load flank and the thread-groove/root surface of the second thread portion are connected by a second curved surface having a smaller radius of curvature r2 than the first curved surface, wherein the first curved surface is provided along at least x turns in the thread-helix direction beginning at the end of the male threadform associated with the pin tip, where x satisfies the following expression, (2):

$$x = (r1 - r2)/\Delta p \quad (2),$$

where Δp is the pitch difference between the load-flank pitch and stab-flank pitch of the male threadform.

3. The threaded connection for steel pipe according to claim 1, wherein the first curved surface is provided along at least ½ turn in the thread-helix direction beginning at the end of the male threadform associated with the pin tip.

4. The threaded connection for steel pipe according to claim 1, wherein the first curved surface is provided across an entire length of the male threadform.

5. The threaded connection for steel pipe according to claim 1, wherein the load flank and the thread-crest surface in the female threadform are connected by a third curved surface that faces the first curved surface when the connection is made up and has a larger radius of curvature than the first curved surface, a radial clearance is provided between the thread-crest surface in a portion of the female threadform which is in contact with the load flank in the end portion of the male threadform associated with the pin tip when the connection is made up, on one hand, and the thread-groove/root surface in a portion of the male threadform which faces that thread-crest surface, and a radially outer end of the first curved surface is located radially outward of a radially inner end of a portion of the third curved surface which faces the first curved surface and is located radially inward of a radially outer end of a portion of the third curved surface which faces the first curved surface.

6. The threaded connection for steel pipe according to claim 1, wherein the male and female threadforms have such thread profiles that, when the connection is made up, the load flank and the stab flank of that thread portion of the male threadform which covers at least 8 turns in the thread-helix direction beginning at the end of the male threadform associated with the pin tip are in contact with the load flank and the stab flank of the female threadform.

7. The threaded connection for steel pipe according to claim 6, wherein a load-flank pitch is not larger than 8.50 mm, a stab-flank pitch is not larger than 8.10 mm, an associated pitch difference is not smaller than 0.35 mm and not larger than 0.45 mm, and a minimum thread width as measured at the end of the male threadform associated with the pin tip and measured at a thread base is not smaller than 2.1 mm.

8. The threaded connection for steel pipe according to claim 1, wherein the steel pipe has an outer diameter larger than 240 mm.

* * * * *